United States Patent
Che et al.

(10) Patent No.: US 11,552,881 B2
(45) Date of Patent: Jan. 10, 2023

(54) FAULTY MULTI-LAYER LINK RESTORATION METHOD AND CONTROLLER

(71) Applicant: HUAWEI TECHNOLOGIES CO., LTD., Guangdong (CN)

(72) Inventors: Jia Che, Beijing (CN); Zhilin Hu, Shenzhen (CN); Changbao Liu, Beijing (CN); Changsheng Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/012,687

(22) Filed: Sep. 4, 2020

(65) Prior Publication Data

US 2020/0403907 A1 Dec. 24, 2020

Related U.S. Application Data

(63) Continuation of application No. PCT/CN2019/102682, filed on Aug. 27, 2019.

(30) Foreign Application Priority Data

Aug. 30, 2018 (CN) .......................... 201811001018.8

(51) Int. Cl.
*H04L 45/28* (2022.01)
*H04L 45/24* (2022.01)

(52) U.S. Cl.
CPC ............ *H04L 45/28* (2013.01); *H04L 45/245* (2013.01)

(58) Field of Classification Search
CPC ......... H04L 45/00; H04L 45/22; H04L 45/28; H04L 45/245; H04L 41/0654
See application file for complete search history.

(56) References Cited

U.S. PATENT DOCUMENTS

2003/0140124 A1 7/2003 Burns
2004/0107382 A1 6/2004 Doverspike et al.
(Continued)

FOREIGN PATENT DOCUMENTS

CN 101626317 A 1/2010
CN 101715149 A 5/2010
(Continued)

OTHER PUBLICATIONS

RFC4208 G. Swallow et al.,"Generalized Multiprotocol Label Switching (GMPLS) User-Network Interface (UNI): Resource ReserVation Protocol-Traffic Engineering (RSVP-TE) Support for the Overlay Model", Network Working Group, dated Oct. 2005,total 13 pages.

(Continued)

*Primary Examiner* — Donald L Mills

(57) ABSTRACT

In a troubleshooting method, a controller first determines that a fault occurs on a first multi-layer link passing through a first port on a first network device, where the first multi-layer link is a link in a link aggregation group between the first network device and a second network device. The controller then releases an optical layer resource of the first multi-layer link, and deletes the first multi-layer link from the link aggregation group. The controller further establishes, a second multi-layer link for restoration of the first multi-layer link, based on a first idle port on the first network device and a second idle port on a target network device, and adds the second multi-layer link to a target link aggregation group between the first network device and the target network device.

24 Claims, 7 Drawing Sheets

(56) References Cited

U.S. PATENT DOCUMENTS

| | | | |
|---|---|---|---|
| 2010/0260177 A1* | 10/2010 | Wu | H04L 45/00 |
| | | | 370/389 |
| 2012/0093030 A1* | 4/2012 | Kim | H04L 45/64 |
| | | | 370/254 |
| 2013/0089317 A1 | 4/2013 | Zhang et al. | |
| 2013/0250903 A1 | 9/2013 | Ahn et al. | |
| 2014/0369186 A1* | 12/2014 | Ernstrom | H04L 45/586 |
| | | | 370/228 |
| 2015/0063802 A1* | 3/2015 | Bahadur | H04L 47/829 |
| | | | 398/49 |
| 2016/0380801 A1 | 12/2016 | Xu et al. | |
| 2017/0201323 A1 | 7/2017 | Prakash et al. | |
| 2017/0295090 A1* | 10/2017 | Gopalan | H04L 45/22 |

FOREIGN PATENT DOCUMENTS

| | | |
|---|---|---|
| CN | 102136940 A | 7/2011 |
| CN | 103916281 A | 7/2014 |
| CN | 103973491 A | 8/2014 |
| CN | 104243015 A | 12/2014 |
| CN | 106330780 A | 1/2017 |
| CN | 108337043 A | 7/2018 |
| JP | 2008160227 A | 7/2008 |
| JP | 2009111477 A | 5/2009 |
| JP | 2013085245 A | 5/2013 |
| WO | 2013161366 A1 | 10/2013 |
| WO | 2016184272 A1 | 11/2016 |

OTHER PUBLICATIONS

International Search Report issued in PCT/CN2019/102682 dated Nov. 15, 2019, total 15 pages.

Notice of Preliminary Rejection dated Apr. 20, 2021 issued in Korean Application No. 10-2020-7015083 (5 pages) and translation (4 pages).

Zhang Xiaoning et al: "Local Fast Reroute With Flow Aggregation in Software Defined Networks", Apr. 1, 2017 (Apr. 1, 2017), pp. 785-788, XP011645057—total 4 pages.

Extended European Search Report dated Feb. 2, 2021 in European Application No. 19854857.0 (9 pgs.).

Notice of Reasons for Rejection dated Jun. 8, 2021 issued in Japanese Application No. 2020-526119 (6 pages) and Translation (8 pages).

Office Action dated Mar. 14, 2022 issued in Chinese Application No. 201911202722.4 (11 pages).

Office Action dated Oct. 8, 2021 issued in Chinese Application No. 201911202722.4 (9 pages).

\* cited by examiner

FAULTY MULTI-LAYER LINK RESTORATION METHOD AND CONTROLLER

CROSS-REFERENCE TO RELATED APPLICATIONS

This application is a continuation of International Application No. PCT/CN2019/102682, filed on Aug. 27, 2019, which claims priority to Chinese Patent Application 201811001018.8, filed on Aug. 30, 2018. The disclosures of the aforementioned applications are hereby incorporated by reference in their entireties.

TECHNICAL FIELD

This disclosure relates to the communications field, and in particular, to a faulty multi-layer link restoration method and a controller.

BACKGROUND

Link aggregation is a method for bundling a group of physical interfaces together into a logical interface, and this method can increase bandwidth and reliability. The logical link formed by bundling the plurality of physical links together is referred to as a link aggregation group (LAG) or a trunk. If all these bundled links are Ethernet links, the aggregation group is referred to as an Ethernet link aggregation group and may be an Eth-trunk for short. An interface of the aggregation group is referred to as an Eth-trunk interface, and a plurality of interfaces in the Eth-trunk are referred to as a plurality of member interfaces. The Eth-trunk interface may be used as a common Ethernet interface. A difference between the Eth-trunk interface and the common Ethernet interface only lies in that: The Eth-trunk needs to select one or more interfaces from the member interfaces during forwarding. Therefore, an Eth-trunk logical interface may be configured in the same way as the common Ethernet interface, except for some features that must be configured only on a physical Ethernet interface. When a fault occurs on a physical link of an Eth-trunk, the faulty physical link needs to be restored. Otherwise, network performance deteriorates or data transmission in a network fails.

SUMMARY

A purpose of embodiments of this disclosure is to provide a link troubleshooting method and a controller.

An aspect of this disclosure provides a troubleshooting method, where the method includes: determining, by a controller, that a fault occurs on a first multi-layer link passing through a first port on a first network device, where the first multi-layer link is a link in a link aggregation group between the first network device and a second network device; releasing, by the controller, an optical layer resource of the first multi-layer link; deleting, by the controller, the first multi-layer link from the link aggregation group; establishing, by the controller, a second multi-layer link used for restoration of the first multi-layer link, based on a first idle port on the first network device and a second idle port on a target network device; and adding, by the controller, the second multi-layer link to a target link aggregation group between the first network device and the target network device.

In a possible embodiment, the target network device is the second network device.

In a possible embodiment, the determining that a fault occurs on a first multi-layer link passing through a first port on a first network device includes: determining that a fault occurs on the first port on the first network device; and determining, based on the fault on the first port, that the fault occurs on the first multi-layer link.

In a possible embodiment, the target network device is a third network device.

In a possible embodiment, the determining that a fault occurs on a first multi-layer link that passes through a first port on a first network device includes: determining that a node fault occurs on the second network device; determining that the first multi-layer link passes through the first port and the second network device; and determining that the fault occurs on the first multi-layer link.

In a possible embodiment, the first idle port is the first port.

In a possible embodiment, the first idle port is not the first port.

In a possible embodiment, the first multi-layer link and the second multi-layer link are links passing through different types of networks.

Another aspect of this disclosure provides a controller. The controller includes a memory and a processor. The memory is configured to store a computer readable instruction. The processor communicates with the memory and is configured to read the computer readable instruction, so as to: determine that a fault occurs on a first multi-layer link passing through a first port on a first network device, where the first link is a link in a link aggregation group between the first network device and a second network device; release an optical layer resource of the first multi-layer link; delete the first multi-layer link from the link aggregation group; establish a second multi-layer link used for restoration of the first multi-layer link, based on a first idle port on the first network device and a second idle port on a target network device; and add the second multi-layer link to a target link aggregation group between the first network device and the target network device.

In a possible embodiment, the target network device is the second network device.

In a possible embodiment, the processor is configured to read the computer readable instruction, so as to: determine that a fault occurs on the first port on the first network device; and determine, based on the fault on the first port, that the fault occurs on the first multi-layer link.

In a possible embodiment, the target network device is a third network device.

In a possible embodiment, the processor is configured to read the computer readable instruction, so as to: determine that a node fault occurs on the second network device; determine that the first multi-layer link passes through the first port and the second network device; and determine that the fault occurs on the first multi-layer link.

In a possible embodiment, the first idle port is the first port.

In a possible embodiment, the first idle port is not the first port.

In a possible embodiment, the first multi-layer link and the second multi-layer link are links passing through different types of networks.

In this disclosure, after determining a faulty multi-layer link in the link aggregation group, the controller not only deletes the faulty multi-layer link from the link aggregation group, but also needs to release an optical network resource of the multi-layer link; then establish, based on an idle port, a new multi-layer link used for restoration of the faulty link, to perform cooperative management on resources of an optical network and an IP network, thereby implementing efficient restoration of the faulty multi-layer link.

DESCRIPTION OF EMBODIMENTS

The following describes example embodiments of the present invention in detail with reference to the accompanying drawings and specific embodiments. However, it should be noted that, the following embodiments are only examples given for ease of understanding of the technical solutions, and are not intended to limit the present invention.

Figure 1:
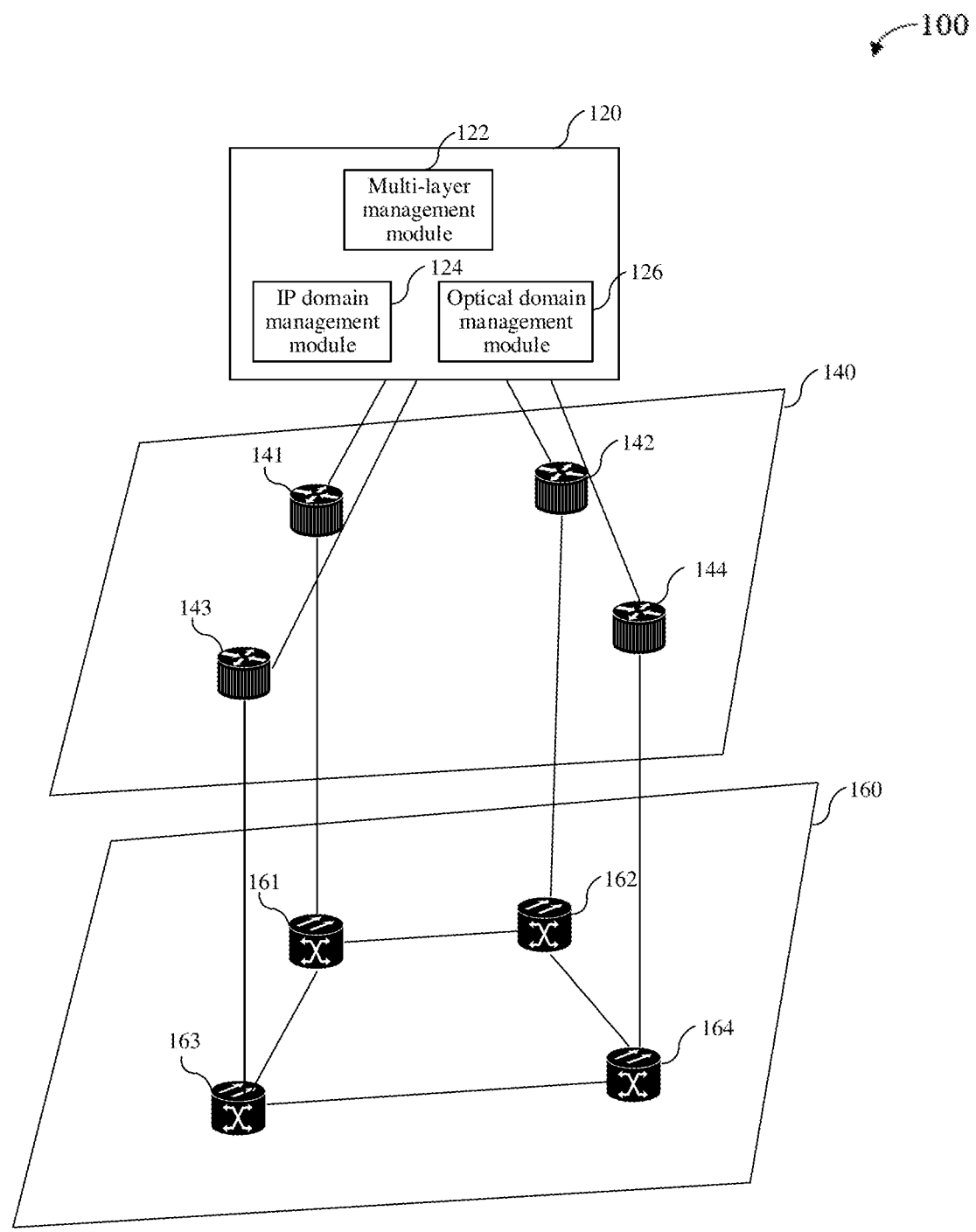
FIG. 1 is a schematic diagram of a network according to an embodiment of the present invention.

FIG. 1 is a schematic diagram of a network according to an embodiment of the present invention. As shown in FIG. 1, the network 100 includes a controller 120, an IP network 140, and an optical network 160.

The controller 120 includes a multi-layer management module 122, an IP domain management module 124, and an optical domain management module 126. These three modules have a plurality of implementations. In some embodiments, the multi-layer management module 122, the IP domain management module 124, and the optical domain management module 126 may be three independent devices or software products. In this case, the controller 120 may be understood as a system including a plurality of independent devices or software products. When the controller 120 is a system including a plurality of independent devices, the multi-layer management module 122, the IP domain management module 124, and the optical domain management module 126 are actually a multi-layer management device 122, an IP domain management device 124, and an optical domain management device 126, respectively. All the three management devices are controllers. In addition, the multi-layer management module 122, the IP domain management module 124, and the optical domain management module 126 may alternatively be implemented on one independent device or software product. The controller 120 may be a software defined network (SDN) controller product.

The IP network 140 includes a plurality of network devices, for example, routers 141 to 144. These routers are directly or indirectly connected to each other, and configure forwarding behaviors of the routers based on configuration command information sent by the controller 120, to route received data. The optical network 160 includes a plurality of optical network elements (ONE), for example, ONEs 161 to 164. In the network shown in FIG. 1, the ONEs 161 to 164 are in a one-to-one correspondence with the routers 141 to 144. When a router, for example, the router 141, needs to send data to another router, for example, the router 142, in order to increase a transfer speed, the router sending the data may first send the data to an ONE corresponding to the router, for example, the ONE 161; the ONE then sends the data to an ONE that corresponds to a target router, for example, the router 142 and that is, for example, the ONE 162, by using an optical network; and the ONE corresponding to the target router then sends the received data to the target router. A link through which the data passes spans the IP network 140 in which the routers 141 and 142 are located and the optical network 160 in which the ONE 161 and the ONE 162 are located; and the IP network 140 may be referred to as an IP layer network, and the optical network 160 may be referred to as an optical layer network. Therefore, the link may be referred to as a multi-layer link. Here, a link connecting the IP network 140 and the optical network 160, for example, a link connecting the router 141 and the ONE 161, is a cross link, also referred to as a patch cord.

The IP domain management module 124 is configured to send control information to a router in the IP network 140, and may further receive IP network status information reported by the IP network 140. The optical domain management module 126 is configured to send control information to an ONE in the optical network 160, and may further receive optical network status information reported by the optical network 160.

Figure 2:
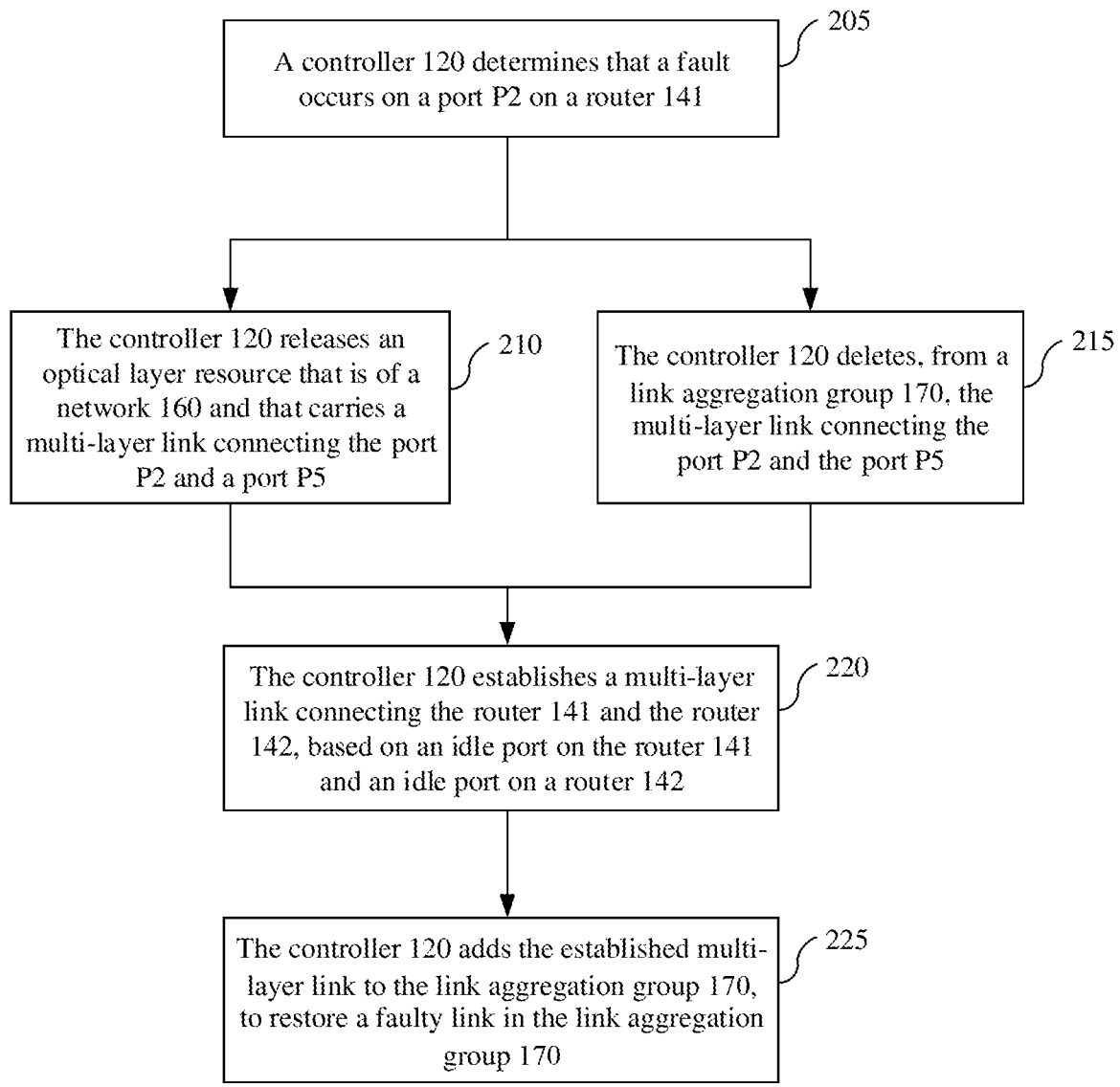
FIG. 2 is a flowchart of a troubleshooting method according to an embodiment of the present invention.
Figure 3:
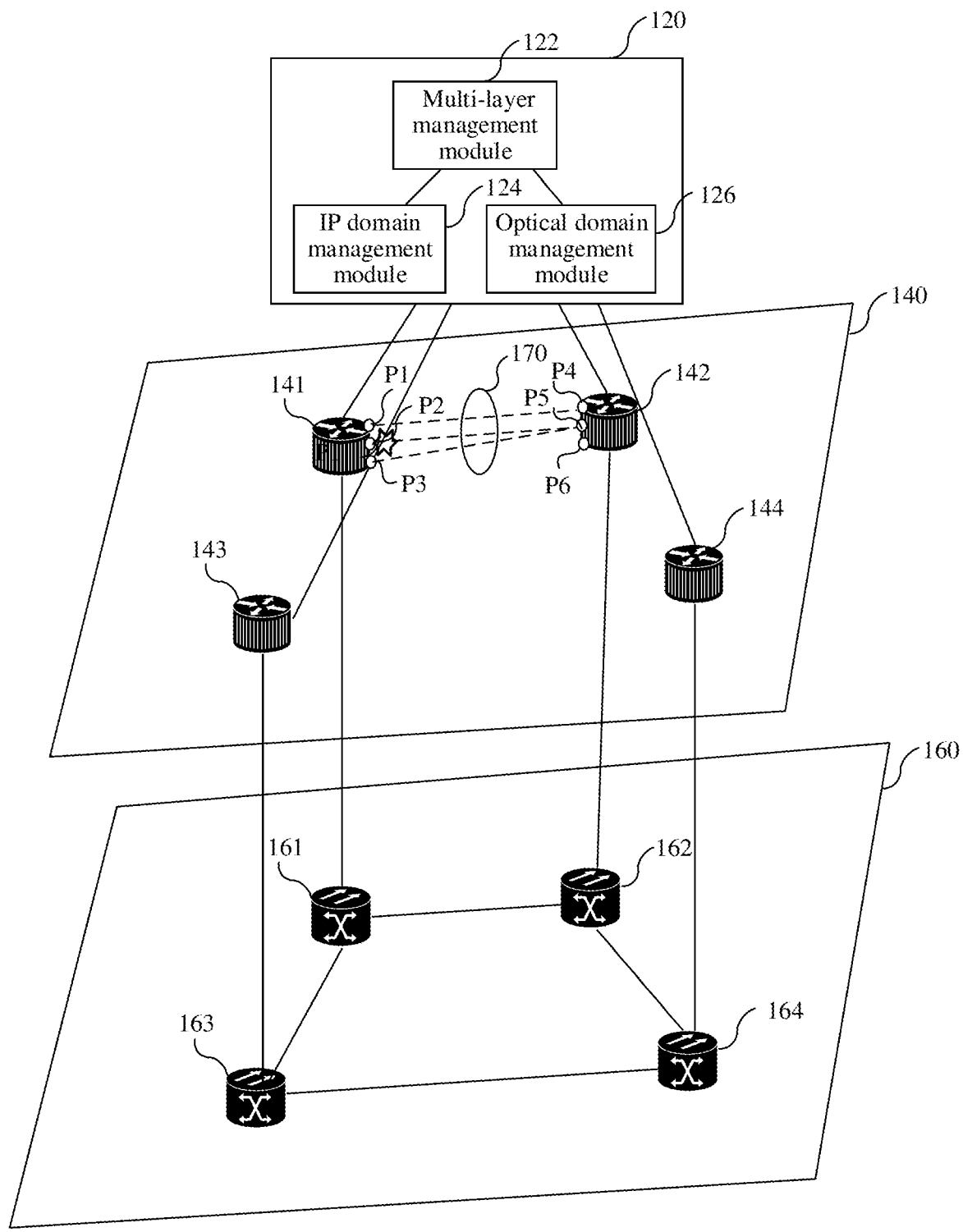
FIG. 3 is a schematic diagram of a network according to an embodiment of the present invention in connection to the embodiment illustrated in FIG. 2.

FIG. 2 is a flowchart of a troubleshooting method according to an embodiment of the present invention. Troubleshooting shown in FIG. 2 is performed based on a network shown in FIG. 3. A network structure shown in FIG. 3 is the same as a network structure of the network shown in FIG. 1. In the network shown in FIG. 3, a controller 120 may determine, based on network status information of an IP network 140 that is stored in the controller 120, that there are ports P1, P2, and P3 on a router 141 and there are ports P4, P5, and P6 on a router 142. The ports P1 and P4 are connected through a multi-layer link, the ports P2 and P5 are connected through a multi-layer link, and the ports P3 and P6 are in an idle state. Both the two multi-layer links belong to one link aggregation group. The network status information may be stored in a multi-layer management module of a controller. In addition, an IP domain management module 124 may store a part of the network status information about the IP network 140, and an optical domain management module 126 may store a part of the network status information about an optical network 160.

The troubleshooting method shown in FIG. 2 includes the following steps.

205. The controller 120 determines that a fault occurs on the port P2 on the router 141.

After detecting that the fault occurs on the port P2, the router 141 sends report information to the controller 120 to report the fault on the port P2. Based on the report information, the controller 120 determines that the fault occurs on the port P2 on the router 141. For example, the IP domain management module 124 receives the report information and sends the report information to a multi-layer management module 122, and the multi-layer management module 122 determines, based on the report information, that the fault occurs on the port P2.

210. The controller 120 releases an optical layer resource that is of the network 160 and that carries the multi-layer link connecting the ports P2 and P5.

For example, the controller 120 sends a release notification to the optical network 160, to instruct the optical network 160 to release the optical layer resource that is of the optical network 160 and that carries the multi-layer link connecting the ports P2 and P5. Inside the controller 120, the multi-layer management module 122 drives the optical domain management module 126 to release the optical layer resource that is of the optical network 160 and that carries the multi-layer link connecting the ports P2 and P5. Correspondingly, the optical domain management module 126 sends a release notification to the optical network 160, so that the optical network 160 releases the optical layer resource that carries the multi-layer link connecting the ports P2 and P5. After receiving the release notification, the optical network 160 releases the optical resource used to transmit the multi-layer link connecting the ports P2 and P5. The release notification may include two pieces of information sent to an ONE 161 and an ONE 162, and the two pieces of information are separately used to instruct the ONE 161 and the ONE 162 to release the optical resource used to transmit the multi-layer link connecting the ports P2 and P5. The controller 120 may update optical network status information of the optical network 160 that is stored in the controller 120. The updated optical network status information of the optical network 160 indicates that the optical resource used to transmit the multi-layer link connecting the ports P2 and P5 is in an idle state. The updated optical network status information may be stored in the multi-layer management module 122, or may be stored in the optical domain management module 126, or may be stored in the multi-layer management module 122 and the optical domain management module 126.

215. The controller 120 deletes, from a link aggregation group 170, the multi-layer link connecting the ports P2 and P5.

For example, the controller 120 may send a deletion notification to the IP network 140 router, to instruct the IP network 140 to delete, from the link aggregation group 170 to which the multi-layer link belongs, the multi-layer link connecting the ports P2 and P5. The deletion notification may include two pieces of information separately sent to the routers 141 and 142, and the two pieces of information are separately used to instruct the routers 141 and 142 to delete, from the link aggregation group 170 to which the multi-layer link belongs, the multi-layer link connecting the ports P2 and P5. The deletion notification may be sent by the IP domain management module 124 driven by the multi-layer management module 122, or may be sent by the IP domain management module 124 alone.

220. The controller 120 establishes a multi-layer link connecting the routers 141 and 142, based on idle ports on the routers 141 and 142.

The controller 120 may determine, based on status information of the IP network 140 that is stored in the controller 120, that a port P3 is further available on the router 141, and determine to use the idle port P3 to establish a new multi-layer link with the router 142. Specifically, a new multi-layer link may be established by using the ports P3 and P5, and a new IP link P3-P6 may be established by using the port P3 and another idle port P6 on the router 142. To establish a multi-layer link connecting the routers 141 and 142, both the IP network 140 and the optical network 160 may be configured, so that the IP domain management module 124 and the optical domain management module 126 may send control information to the IP network 140 and the optical network 160 under the control of the multi-layer management module. In this way, the multi-layer link connecting the routers 141 and 142 is established.

225. The controller 120 adds the established multi-layer link to the link aggregation group 170, to restore a faulty link in the link aggregation group 170. For example, the IP domain management module 124 may send control information to the routers 141 and 142 under the control of the multi-layer management module 122, so that the routers 141 and 142 add the multi-layer link established in 220 to the link aggregation group 170.

Figure 4:
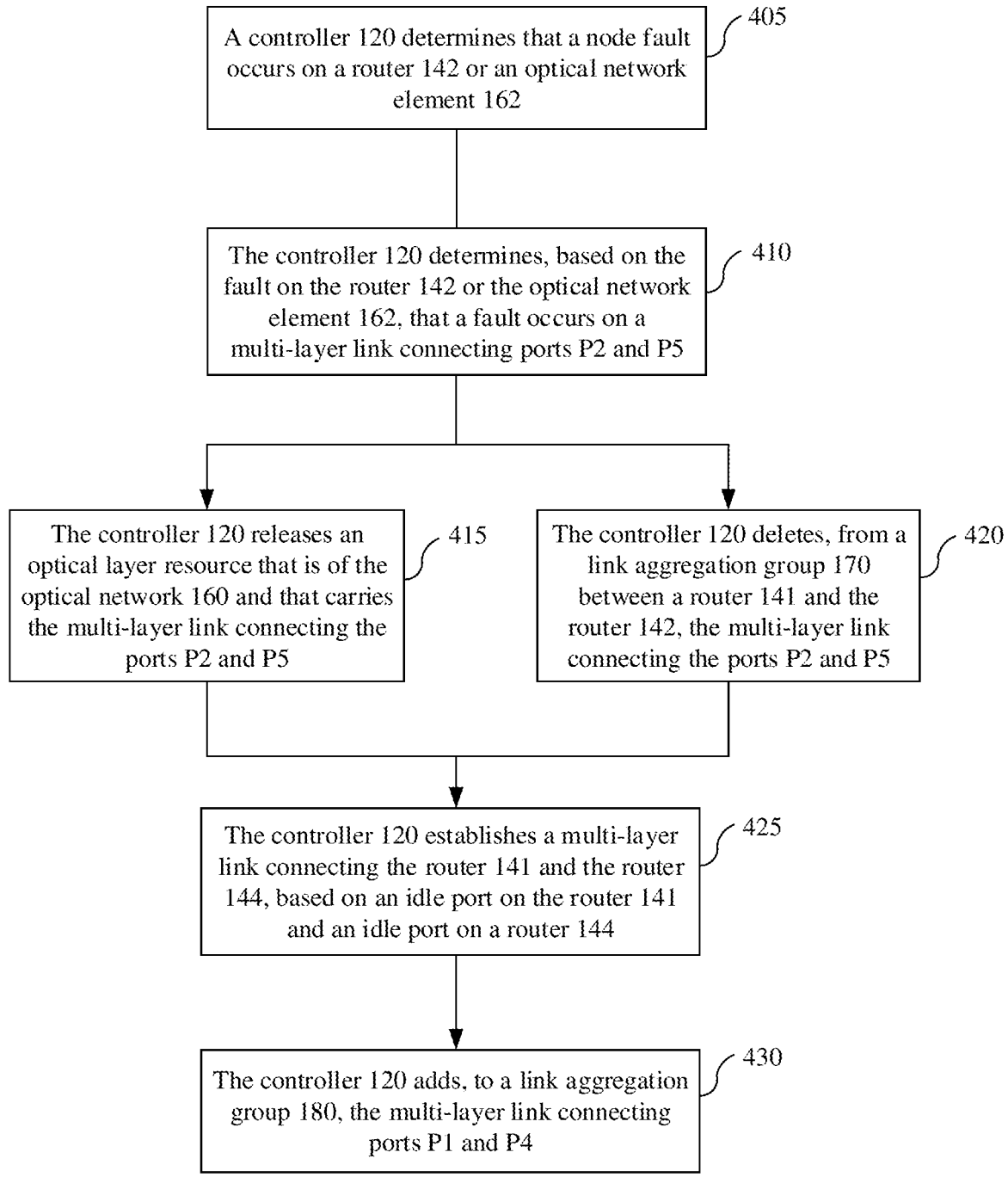
FIG. 4 is a flowchart of a troubleshooting method according to another embodiment of the present invention.
Figure 5:
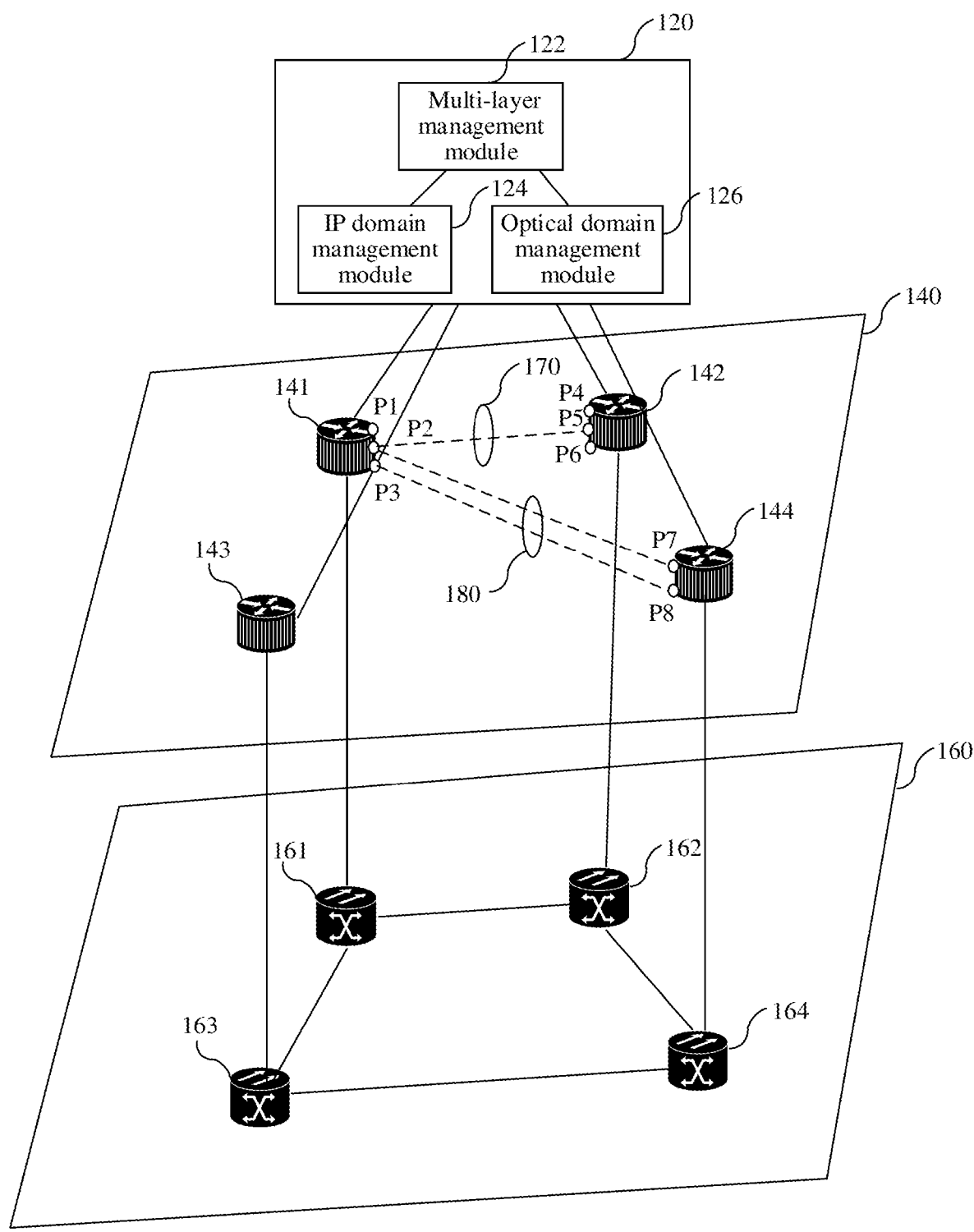
FIG. 5 is a schematic diagram of a network according to an embodiment of the present invention in connection to the embodiment illustrated in FIG. 4.

FIG. 4 is a flowchart of a troubleshooting method according to another embodiment of the present invention. Troubleshooting shown in FIG. 4 is performed based on a network shown in FIG. 5. A network structure of the network shown in FIG. 5 is the same as a network structure of the network shown in FIG. 1. In the network shown in FIG. 5, a controller 120 may determine, based on network status information stored in the controller 120, that there are ports P1, P2, and P3 on a router 141, there are ports P4, P5, and P6 on a router 142, and there are ports P7 and P8 on a router 144. A working link that connecting the ports P2 and P5 and a protection link connecting the ports P3 and P8 are configured for the controller 120. Both the working link and the protection link are multi-layer links. The protection link is used to protect the working link. For example, the router 141 switches traffic from the working link to the protection link when the working link is faulty. The network status information may be stored in a multi-layer management module 122 of the controller. In addition, an IP domain management module 124 may store a part of the network status information about the IP network 140, and an optical domain management module 126 may store a part of the network status information about an optical network 160.

The fault protection method shown in FIG. 4 includes the following steps.

405. The controller 120 determines that a node fault occurs on the router 142 or an optical network element 162. For example, the controller 120 may sense a node fault on the router 142 by using the IP domain management module 124, and may sense a node fault on the optical device 162 by using the optical domain management module 126. Both the router 142 and the optical network element 162 are network devices used for data transmission. The optical network element 162 is an optical network element corresponding to the router 142, because the optical network element 162 is configured to send and receive, on the optical network, data that is mutually communicated between the router 142 and one or more routers.

410. The controller 120 determines, based on the fault on the router 142 or the optical device 162, that a multi-layer link connecting the port P2 and the port P5 is faulty. When the node fault occurs on the router 142, the multi-layer management module 122 of the controller 120 may determine that a fault occurs on the router 142, based on fault information that is reported by the IP domain management module 124 and that is used to notify that the node fault occurs on the router 142. Because the multi-layer management module 122 already knows that the port P5 is on the routing device 142 and there is a multi-layer link connecting the ports P2 and P5, the multi-layer management module 122 may determine that a fault occurs on the multi-layer link connecting the ports P2 and P5. When the node fault occurs on the optical network element 162, the multi-layer management module 122 of the controller 120 may determine that a fault occurs on the optical network element 162, based on fault information that is reported by the optical domain management module 126 and that is used to notify that the node fault occurs on the optical network element 162. Because the multi-layer management module 122 already knows that the optical network element is configured to send and receive data for the router 142, the port P5 is on the router 142, and there is a multi-layer link connecting the ports P2 and P5, the multi-layer management module 122 may determine that a fault occurs on the multi-layer link connecting the ports P2 and P5.

415. The controller 120 releases an optical layer resource that is of the optical network 160 and that carries the multi-layer link connecting the ports P2 and P5. For example, the controller 120 sends a release notification to the optical transport network 160, to make the optical network 160 release the optical layer resource that is of the optical network 160 and that carries the multi-layer link connecting the ports P2 and P5. During specific implementation, the release notification may be used to instruct the optical network 160 to release an optical layer resource that is of the optical network 160 and that carries each multi-layer link passing through the router 142, or may be used to instruct the optical network 160 to release the optical layer resource that is of the optical network 160 and that only carries the multi-layer link connecting the ports P2 and P5. For release notification sending, the multi-layer management module 122 may drive the optical domain management module 126 to send the release notification, or the optical domain management module 126 may determine by itself to send the release notification. When the node fault means that a fault occurs on the router 142, the release notification may be one piece of information sent to the optical network element 161 or 162, or may include a plurality of pieces of information sent to a plurality of optical network elements including the optical network elements 161 and 162. When the node fault means that a fault occurs on the optical network element 162, the release notification may be one piece of information sent to the optical network element 161, or may include a plurality of pieces of information sent to a plurality of optical network elements including the optical network element 161. Because the fault occurs on the optical network element 162, the controller 120 may not send, to the optical network element 162, information used to instruct the optical network element 162 to release the optical layer resource that carries the multi-layer link connecting the ports P2 and P5. However, because the optical network element 162 may have a processing capability, the controller 120 may alternatively send, to the optical network element 162, information used to instruct the optical network element 162 to release the optical layer resource that carries the multi-layer link connecting the ports P2 and P5.

420. The controller 120 deletes, from a link aggregation group 170 between the routers 141 and 142, the multi-layer link connecting the ports P2 and P5. For example, the controller 120 sends a deletion notification to the IP network 140, so that the IP network 140 deletes, from the link aggregation group 170 between the routers 141 and 142, the multi-layer link connecting the ports P2 and P5. In addition, the controller 120 may alternatively delete, from configuration information that is of the link aggregation group and that is stored in the controller 120, the multi-layer link connecting the ports P2 and P5, so that the controller stores correct network status information. When the link aggregation group between the routers 141 and 142 is an Ethernet aggregation group Eth-Trunk, the multi-layer link connecting the ports P2 and P5 needs to be deleted from the Eth-Trunk. For delete notification sending, the multi-layer management module 122 may drive the IP domain management module 144 to send the delete notification, or the IP domain management module 144 may determine by itself to send the delete notification. When the node fault means that a fault occurs on the router 142, the deletion notification may be one piece of information sent to the router 141, or may include a plurality of pieces of information sent to a plurality of routers including the router 141. Because the fault occurs on the router 142, the controller 120 may not send, to the router 142, information used to instruct the router 142 to delete the multi-layer link connecting the ports P2 and P5. However, because the router 142 may have a processing capability, the controller 120 may alternatively send, to the router 142, information used to instruct the router 142 to delete the multi-layer link connecting the ports P2 and P5.

425. The controller 120 establishes a multi-layer link connecting the router 141 and the router 144, based on an idle port on the router 141 and an idle port on the router 144. The router 144 may be a router on which the port P8 on the protection link is located, or may not be a router on which the port P8 is located. The multi-layer link connecting the router 141 and the router 144 may connect an idle port on the router 141, for example, the port P1 or an idle port different from the port P1, and an idle port on the router 144, for example, the port P7. The controller 120 may send configuration information to the routers 141 and 144 and the optical network elements 161 and 164, thereby establishing the multi-layer link of the router 141 and the router 144.

430. The controller 120 adds, to a link aggregation group 180 to which the protection link belongs, the multi-layer link connecting the ports P1 and P4. In this way, the link connecting the ports P2 and P5 can be replaced with a multi-layer link connecting the ports P2 and P7, and the faulty link connecting the ports P2 and P5 is restored. After a fault occurs on the multi-layer link passing through the ports P2 and P5, traffic may be switched from the link to a protection link passing through the ports P3 and P8. If the traffic has been switched to the protection link, the controller 120 may switch or nor switch the traffic to the multi-layer link established in step 425.

Figure 6:
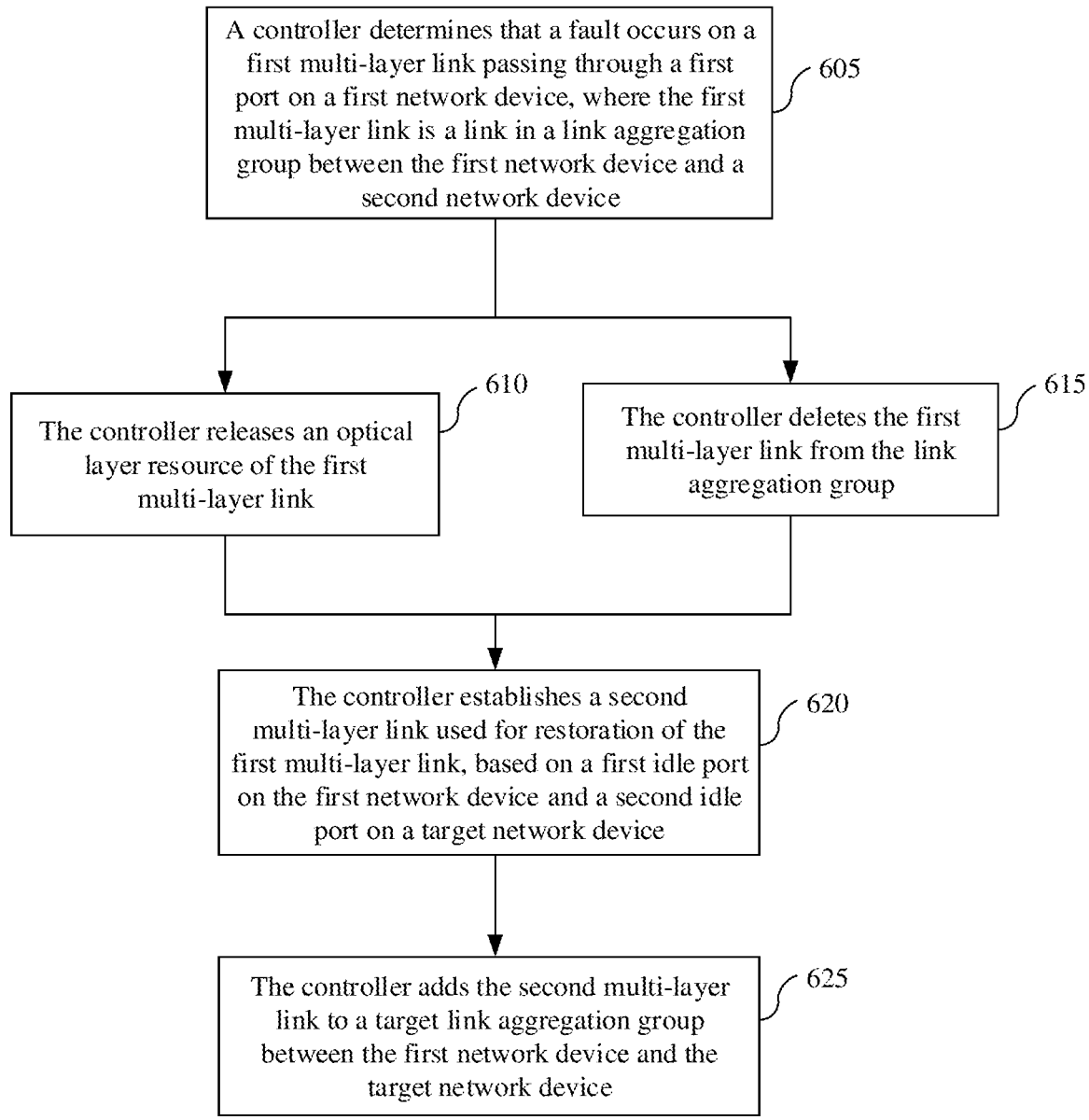
FIG. 6 is a flowchart of a troubleshooting method according to another embodiment of the present invention.

FIG. 6 is a flowchart of a troubleshooting method according to another embodiment of the present invention. The troubleshooting method includes the following steps.

605. A controller determines that a fault occurs on a first multi-layer link passing through a first port on a first network device, where the first link is a link in a link aggregation group between the first network device and a second network device.

The controller may determine, by detecting whether a fault occurs on a network device at any of two ends of the first multi-layer link, whether the fault occurs on the first multi-layer link. When determining that a fault occurs on the first port, the controller may determine that the fault occurs on the first multi-layer link. For example, when a fault occurs on the port P2 in FIG. 3, it can be determined that a fault occurs on the link connecting the port P2 and the port P5. In addition, when determining that a node fault occurs on the second network device, the controller may alternatively determine that the fault occurs on the first multi-layer link.

The controller may alternatively determine, by using a fault on an optical network element corresponding to any of network devices at two ends, that the fault occurs on the first multi-layer link. For example, when a node fault occurs on the optical network element 162, the controller may determine that a node fault occurs on the network device 142 corresponding to the optical network element 162, and further determine that faults occur on all multi-layer links between the network node 142 and the network node 141. If the first port is a port that is on the network node 141 and that is connected to the network node 142, the controller may determine that the fault occurs on the first multi-layer link passing through the first port.

610. The controller releases an optical layer resource of the first multi-layer link.

Because the first multi-layer link passes through an IP network and an optical network, the controller needs to release the optical layer resource of the first multi-layer link, to avoid waste of the optical layer resource. The optical layer resource of the first multi-layer link may be an optical resource between two optical network elements respectively corresponding to two IP layer network devices on the first multi-layer link. For example, in FIG. 5, if a fault occurs on the multi-layer link connecting P2 and P5, the controller 120 needs to release an optical layer resource of the multi-layer link, connecting the ports P2 and P5, that is, to release the optical resource that is of the optical network elements 161 and 162 and that is used to transmit data on the multi-layer link connecting the ports P2 and P5. The controller may not only send information about the optical resource releasing to the two optical transmission nodes, but also release the optical resource that is locally recorded by the controller and that is used to transmit data on the multi-layer link connecting the ports P2 and P5.

615. The controller deletes the first multi-layer link from the link aggregation group.

Because the first multi-layer link is already faulty, the first multi-layer link needs to be deleted from the link aggregation group, to avoid a data loss. The controller may send a deletion notification to two network devices connected by using the first multi-layer link, so that the two network devices delete the first multi-layer link from configuration information that is of the link aggregation group and that is stored in the controller. The controller may alternatively delete the first multi-layer link from configuration information that is of the link aggregation group and that is stored in the controller.

620. The controller establishes a second multi-layer link used for restoration of the first multi-layer link, based on a first idle port on the first network device and a second idle port on a target network device.

The first idle port may be the first port on the first network device, or may be another idle port on the first network device.

The target network device needs to be selected based on a fault type. When a node fault occurs on the second network device, the target network device may not be the second network device, but is required to be a third network device different from the first network device and the second network device. The third network device is a backup device of the second network device. When no node fault occurs on the second network device and the fault on the first link is caused by a port fault, the target network device may be either the second network device or the third network device.

625. The controller adds the second multi-layer link to a target link aggregation group between the first network device and the target network device.

In this way, the faulty first multi-layer link is restored by the second multi-layer link. A bandwidth loss caused by the fault on the first multi-layer link may be compensated by adding the second multi-layer link to the target link aggregation group.

Figure 7:
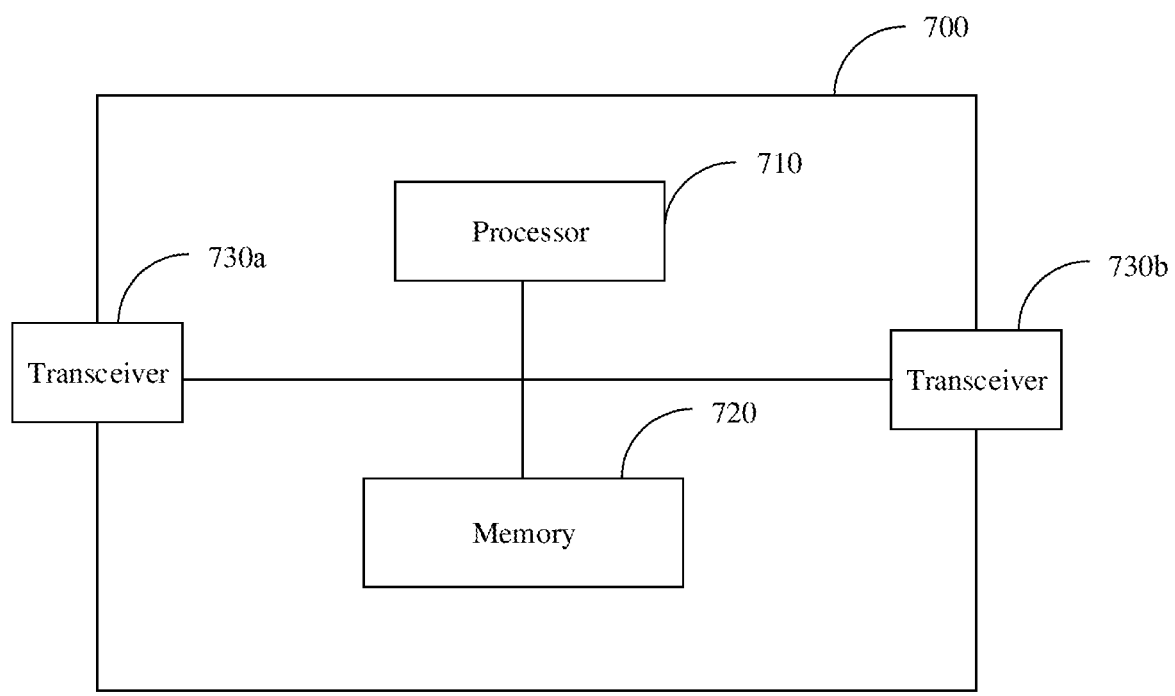
FIG. 7 is a schematic diagram of a structure of a controller according to an embodiment of the present invention.

FIG. 7 is a block diagram of a structure of a controller 700 according to an embodiment of the present invention. As shown in FIG. 7, the controller 700 includes a processor 710, a memory 720 in communication with the processor 710, and at least one transceiver 730a-730b. When the multi-layer management module 122, the IP domain management module 124, and the optical domain management module 126 in FIG. 1, FIG. 3, or FIG. 5 are three modules in one device, but are not three discrete devices, the controller 700 may be the controller 120 in FIG. 1, FIG. 3, or FIG. 5. When the multi-layer management module 122, the IP domain management module 124, and the optical domain management module 126 in FIG. 1, FIG. 3, or FIG. 5 are three independent devices, the controller 120 is actually a control system. In this case, the controller 700 may be the multi-layer management module 122, which is actually the multi-layer management device 122.

The processor 710 may be a central processing unit (CPU), a network processor (NP), or a combination of a CPU and an NP. The processor may alternatively be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor 710 may be one processor, or may include a plurality of processors. The memory 720 may be one memory, or may include a plurality of memories. The memory 720 may include a volatile memory, for example, a random access memory (RAM); or the memory may include a non-volatile memory, for example, a read-only memory (ROM), a flash memory, a hard disk drive (HDD), or a solid-state drive (SSD); and the memory may further include a combination of the foregoing types of memories. The memory 720 stores a computer readable instruction, and the computer readable instruction includes a plurality of software modules. After executing each software module, the processor 710 may perform a corresponding operation according to an indication of each software module. After executing the computer readable instruction in the memory 720, the processor 710 may execute, according to an indication of the computer readable instruction, all operations executed by the controller 120 or the multi-layer management module 122 that serves as an independent device. In addition, when the multi-layer management module 122, the IP domain management module 124, and the optical domain management module 126 in FIG. 1, FIG. 3, or FIG. 5 are three modules in one device, the multi-layer management module 122 may be understood to be implemented based on the processor 710, the memory 720, and a multi-layer management software module stored in the memory 720. Similarly, the IP domain management module 124 may be understood to be implemented based on the processor 710, the memory 720, and an IP domain management software module stored in the memory 720. The optical domain management module 126 may be understood to be implemented based on the processor 710, the memory 720, and an optical domain management software module stored in the memory 720.

The foregoing descriptions are merely examples of specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A troubleshooting method comprising:
obtaining that a fault occurs on a first multi-layer link passing through a first port on a first network device, wherein the first multi-layer link is a link in a link aggregation group between the first network device and a second network device, the first multi-layer link comprises a first cross-layer link, and the first cross-layer link spans different types of networks;
based upon the obtaining that the fault occurs on the first multi-layer link, establishing a second multi-layer link used for restoration of the first multi-layer link, based on a first idle port on the first network device and a second idle port on a target network device, wherein the second multi-layer link comprises a second cross-layer link, and the second cross-layer link spans the different types of networks; and adding the second multi-layer link to a target link aggregation group between the first network device and the target network device.

2. The method according to claim 1, the method further comprising:

releasing an optical layer resource of the first multi-layer link and deleting the first multi-layer link from the link aggregation group.

3. The method according to claim 1, wherein the obtaining that the fault occurs on the first multi-layer link passing through the first port on the first network device comprises:

determining that a fault occurs on the first port on the first network device; and determining, based on the fault occurring on the first port, that the fault occurs on the first multi-layer link.

4. The method according to claim 1, wherein the obtaining that the fault occurs on the first multi-layer link passing through the first port on the first network device comprises:

determining that a node fault occurs on the second network device;

determining that the first multi-layer link passes through the first port and the second network device; and determining that the fault occurs on the first multi-layer link based on the determination that the node fault occurs on the second network device and the determination that the first multi-layer link passes through the first port and the second network device.

5. The method according to claim 1, wherein the different types of networks spanned by the first cross-layer link and the second cross-layer link includes an optical network and an IP network.

6. The method according to claim 1, wherein establishing the second multi-layer link based on the first idle port on the first network device and the second idle port on the target network device comprises:

corresponding to obtaining the fault occurs on the first multi-layer link, establishing the second multi-layer link based on the first idle port on the first network device and the second idle port on the target network device.

7. The method according to claim 3, wherein the target network device is the second network device, the first idle port is a port on the first network device, and the second idle port is a port on the first multi-layer link.

8. The method according to claim 4, wherein the target network device is a third network device, the first idle port is the first port, the second idle port is a port on the third network device.

9. The method according to claim 1, wherein the obtaining that a fault occurs on a first multi-layer link passing through a first port on a first network device comprises:

obtaining that a port fault occurs on the first multi-layer link on the second network device;

determining that the fault occurs on the first multi-layer link.

10. The method according to claim 9, wherein the target network device is the second network device, the first idle port is the first port, and the second idle port is a port on the second network device.

11. A controller comprising:

a memory, configured to store computer readable instructions;

a processor in communication with the memory, configured to execute the computer readable instructions to:

obtain that a fault occurs on a first multi-layer link passing through a first port on a first network device, wherein the first multi-layer link is a link in a link aggregation group between the first network device and a second network device, the first multi-layer link comprises a first cross-layer link, and the first cross-layer link spans different types of networks;

based upon the obtaining that the fault occurs on the first multi-layer link, establish a second multi-layer link to restore the first multi-layer link, based on a first idle port on the first network device and a second idle port on a target network device, wherein the second multi-layer link comprises a second cross-layer link, and the second cross-layer link spans the different types of networks; and add the second multi-layer link to a target link aggregation group between the first network device and the target network device.

12. The controller according to claim 11, wherein the processor is further configured to execute the computer readable instructions to:

release an optical layer resource of the first multi-layer link and delete the first multi-layer link from the link aggregation group.

13. The controller according to claim 11, wherein the processor is further configured to execute the computer readable instructions to:

determine that a fault occurs on the first port on the first network device; and determine, based on the fault occurring on the first port, that the fault occurs on the first multi-layer link.

14. The controller according to claim 11, wherein the processor is further configured to execute the computer readable instructions to:

determine that a node fault occurs on the second network device;

determine that the first multi-layer link passes through the first port and the second network device; and determine that the fault occurs on the first multi-layer link based on the determination that the node fault occurs on the second network device and the determination that the first multi-layer link passes through the first port and the second network device.

15. The controller according to claim 11, wherein the different types of networks spanned by the first cross-layer link and the second cross-layer link includes an optical network and an IP network.

16. The controller according to claim 11, wherein the processor is further configured to execute the computer readable instructions to:

corresponding to obtaining the fault occurs on the first multi-layer link, establish the second multi-layer link based on the first idle port on the first network device and the second idle port on the target network device.

17. The controller according to claim 13, wherein the target network device is the second network device, the first idle port is a port on the first network device, and the second idle port is a port on the first multi-layer link.

18. The controller according to claim 14, wherein the target network device is a third network device, the first idle port is the first port, the second idle port is a port on the third network device.

19. The controller according to claim 11, wherein the processor is further configured to execute the computer readable instructions to:
- obtain that a port fault occurs on the first multi-layer link on the second network device;
- determine that the fault occurs on the first multi-layer link.

20. The controller according to claim 19, wherein the target network device is the second network device, the first idle port is the first port, and the second idle port is a port on the second network device.

21. A non-transitory computer-readable storage media storing instructions which upon execution by a computer system perform steps comprising:
- determining that a fault occurs on a first multi-layer link passing through a first port on a first network device, wherein the first multi-layer link is a link in a link aggregation group between the first network device and a second network device, the first multi-layer link comprises a first cross-layer link, and the first cross-layer link spans different types of networks;
- based upon the obtaining that the fault occurs on the first multi-layer link, establishing a second multi-layer link used for restoration of the first multi-layer link, based on a first idle port on the first network device and a second idle port on a target network device, wherein the second multi-layer link comprises a second cross-layer link, and the second cross-layer link spans the different types of networks; and
- adding the second multi-layer link to a target link aggregation group between the first network device and the target network device.

22. The non-transitory computer-readable storage media according to claim 21, the steps further comprising:
- releasing an optical layer resource of the first multi-layer link and deleting the first multi-layer link from the link aggregation group.

23. The non-transitory computer-readable storage media according to claim 21, wherein:
- the determining that the fault occurs on the first multi-layer link comprises determining that a fault occurs on the first port on the first network device or determining that a fault occurs at the second network device; and
- based upon the determining that the fault occurs on the first port on the first network device, the target network device is defined to be the second network device; or
- based upon the determining that the fault occurs at the second network device, the target network device is defined to be a third network device.

24. The non-transitory computer-readable storage media according to claim 21, wherein the different types of networks spanned by the first cross-layer link and the second cross-layer link includes an optical network and an IP network.

* * * * *